Figure 1:
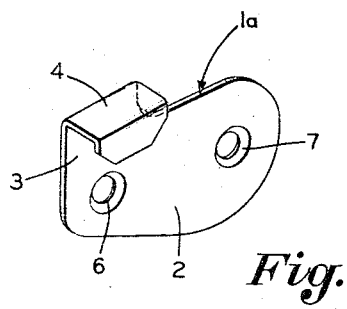

Oct. 17, 1967   J. W. GOSS   3,347,504
CLIPS FOR MIRRORS
Filed July 22, 1966

INVENTOR.
James W. Goss
BY
Frease & Bishop
ATTORNEYS 3,347,504
CLIPS FOR MIRRORS
James W. Goss, 410 South St. SW.,
Warren, Ohio 44483
Filed July 22, 1966, Ser. No. 567,109
4 Claims. (Cl. 248—488)

The invention relates to clips for securing sheet glass mirrors and the like to walls or similar supporting surfaces.

A general object of the invention is to provide a simple, efficient device for attaching a sheet glass mirror and the like to a wall or similar supporting surface.

Another object of the invention is to provide a clip of the character referred to which is stamped from a single sheet of metal.

A further object of the invention is to provide such a clip having two spaced apertures for receiving screws or similar attaching means, one of the apertures being used when the clip is used at the lower edge of the mirror, the other opening being used when the clip is located at the upper edge of the mirror.

Still another object of the invention is the provision of a clip of the character referred to formed in pairs, each pair comprising a left-hand clip and a right-hand clip which are the same in construction but reversed relative to each other.

It is also an object of the invention to provide a clip of this character having a relatively long leg with an angularly disposed relatively short leg at one end thereof having a channel formed therein, an aperture being located near each end of the longer leg.

The above objects together with others which will be apparent from the drawing and following description, or which may be later referred to, may be attained by constructing the improved clips for mirrors in the manner hereinafter described in detail and illustrated in the accompanying drawing.

In general terms the invention may be briefly described as comprising a clip formed from a single sheet of metal formed into a flat, relatively long leg, with a relatively short leg at one end thereof and located at slightly greater than a right angle thereto, the shorter leg terminating in an out-turned channel portion of suitable width to receive the edge of a sheet glass mirror or the like, a pad of felt or the like being located in said channel portion for engagement with the edge of the mirror.

Two apertures for receiving screws, or other attaching means are located in the longer leg of the clip. One of these apertures is located in the end of said longer leg adjacent the shorter leg for receiving a screw or the like for securing the clip to a wall or other supporting surface with the shorter leg thereof disposed downwardly and the channel portion thereof being open upwardly for receiving and supporting the lower edge of a mirror.

The other aperture is located in the other end of the longer flat leg and adapted to receive a screw or the like for pivotally connecting the clip to the wall or other supporting surface so that the clip may be mounted in substantially upright position and then swung downward to engage the channel portion over the upper edge of the mirror.

Figure 2:
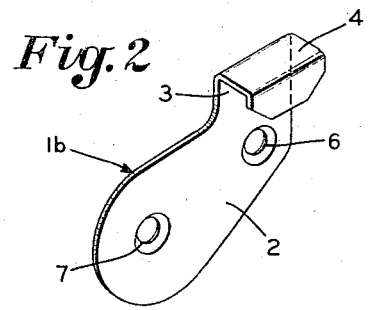
Figure 3:
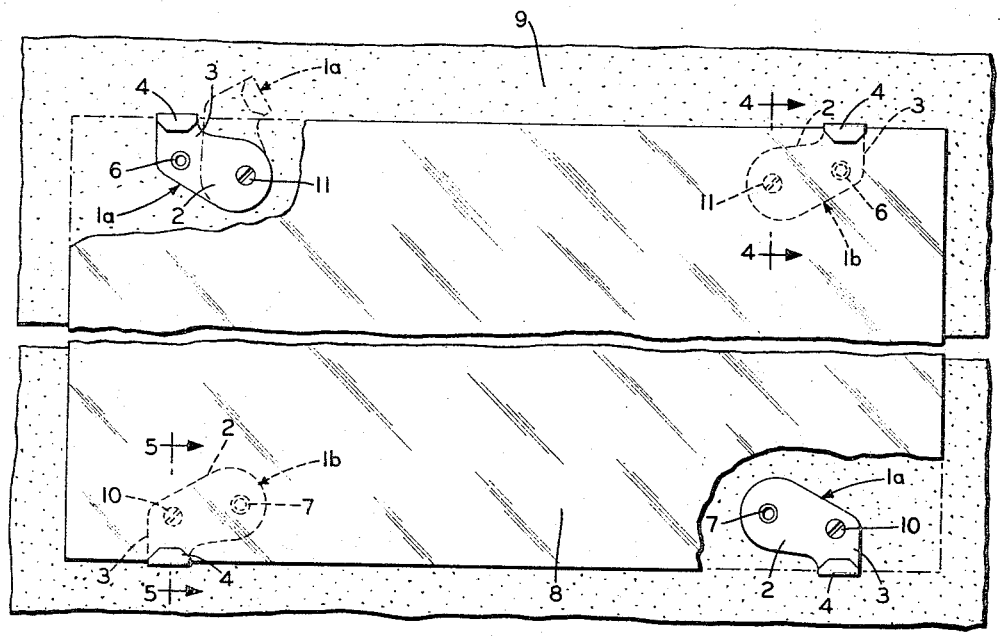
Figure 5:
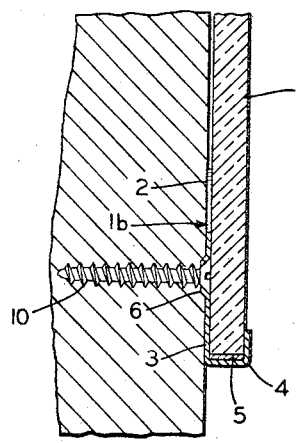
Figure 4:
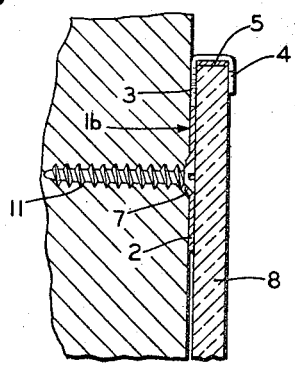

A preferred embodiment of the invention is illustrated in the accompanying drawing, in which:

FIG. 1 is a perspective view of one clip of a pair;
FIG. 2 is a perspective view of the other clip of the pair;
FIG. 3 is a fragmentary elevation of a mirror mounted upon a wall or the like with clips embodying the invention, parts being broken away for the purpose of illustration;
FIG. 4 is an enlarged section on the line 4—4, FIG. 3, through one of the clips at the top edge of the mirror; and
FIG. 5 is an enlarged section on the line 5—5, FIG. 3, through one of the clips at the lower edge of the mirror.

The improved clips to which the invention pertains are preferably made in pairs as indicated generally at 1a and 1b. The two clips of the pair are alike excepting that they are reversed relative to each other so as to provide a left and a right for each pair.

Each clip is stamped from a single piece of sheet metal and comprises the longer flat leg, indicated at 2 and the shorter leg 3 located at one end thereof and disposed at a little more than a right angle to the leg 2.

The shorter leg 3 is bent outwardly and then backwardly to form a channel portion 4, having a pad of felt or the like located in the bottom of the channel, as indicated at 5, to contact the adjacent edge of the mirror, as will be later described.

Each clip is provided with two spaced apertures, one near each end thereof. The aperture 6 is located at the end of the long leg 2 adjacent to the shorter leg 3, and the aperture 7 is located at the other end of the longer leg 2. Each of the apertures 6 and 7 is preferably countersunk, as best shown in FIGS. 1 and 2, for receiving the heads of screws or other attaching means.

As shown in FIG. 3, the clip 1a is used at the right side of the lower edge of a mirror, indicated at 8, and the clip 1b at the left side of the lower edge thereof. Each of these lower clips is rigidly secured to the wall, or other supporting surface 9, as by a screw or the like 10 located through the aperture 6 thereof, which in this position of the clips is directly above the channel portion 4 of the shorter leg 3. Thus, the lower edge of the mirror 8 is received in the channel portions 4 of these two lower clips which support the mirror in this position on the wall.

The positions of the pair of clips at the upper edge of the mirror 8 are reversed, the clip 1a being mounted upon the wall near the left end of the upper edge of the mirror, while the clip 1b is mounted upon the wall near the right end thereof.

The upper clips are pivotally connected to the wall or other supporting surface by screws 11, similar to the screws 10. The screws or pivots 11 are located through the apertures 7 in the opposite ends of the longer legs 2 and need only be tightened in the wall sufficiently to pivotally support these upper clips thereon.

These upper clips may be first located upright as indicated in broken lines at 1a in FIG. 3. After the lower edge of the mirror 8 has been seated in the channel portions 4 of the lower clips, the upper end of the mirror may be pressed back toward the wall and the upper clips swung down upon their pivots 11 to the full line positions shown in FIG. 3, thus engaging the channel portions 4 thereof over the upper edge of the mirror 8 holding the same flat against the wall or other supporting surface.

From the above it will be obvious that by forming the clips with openings near each end thereof, as illustrated and above described, it will be seen that the same type of clip may be used at both the top and bottom edges of the mirror, by locating a screw or other attaching means through one aperture in the bottom clips, and through the other aperture in the top clips.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention or discovery, the construction, the operation, and use of a preferred embodiment thereof, and the advantageous new and useful results obtained thereby; the new and useful construction, and reasonable mechanical equivalents thereof obvious to those skilled in the art, are set forth in the appended claims.

I claim:

1. Means for mounting and supporting an object such as a sheet glass mirror, said means comprising a plurality of similar clips adapted to be fastened to a supporting surface such as a wall, each clip being formed of a single piece of sheet metal comprising a flat long leg and an angularly disposed short leg at one end thereof, a channel portion formed upon the short leg, there being an aperture in each end of said long leg, the aperture in the end adjacent said short leg being adapted to receive an attaching means when the short leg is disposed downward with the channel open upward to receive the lower edge of a mirror, and the aperture in the other end being adapted to receive an attaching means when the short leg is disposed upward with the channel open downward to receive the upper edge of a mirror.

2. Means for mounting and supporting an object such as a sheet glass mirror as defined in claim 1, in which the short leg of each clip is disposed at slightly greater than a right angle to the long leg thereof.

3. Means for mounting and supporting an object such as a sheet glass mirror as defined in claim 1, in which the clips are formed in pairs, the clips in each pair being alike except that they are reversed providing a right-hand clip and a left-hand clip in each pair.

4. Means for mounting and supporting an object such as a sheet glass mirror as defined in claim 1, in which said other end of each long leg is substantially semi-circular and the side edges of said long leg converge toward the short leg.

References Cited

UNITED STATES PATENTS

| | | | |
|---|---|---|---|
| 1,512,335 | 10/1924 | Heavin | 248—488 |
| 1,688,425 | 10/1928 | La Hodny et al. | 248—488 |
| 3,203,142 | 8/1965 | Narmore | 52—27 |
| 3,237,898 | 3/1966 | Goss | 248—488 X |

JOHN PETO, *Primary Examiner.*